US011267061B2

(12) United States Patent
Eseltine et al.

(10) Patent No.: US 11,267,061 B2
(45) Date of Patent: Mar. 8, 2022

(54) METHOD OF MANUFACTURING COMPONENTS MADE OF DISSIMILAR METALS

(71) Applicant: GM Global Technology Operations LLC, Detroit, MI (US)

(72) Inventors: Dustin E. Eseltine, Clarkston, MI (US); Elizabeth Chevalier, Rochester, MI (US); Austin M. Davis, Lake Orion, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 332 days.

(21) Appl. No.: 16/385,750

(22) Filed: Apr. 16, 2019

(65) Prior Publication Data

US 2020/0331085 A1    Oct. 22, 2020

(51) Int. Cl.
| | | |
|---|---|---|
| *B23K 1/00* | (2006.01) | |
| *F16H 1/28* | (2006.01) | |
| *B23K 1/002* | (2006.01) | |
| *B23K 1/005* | (2006.01) | |
| *B23K 35/02* | (2006.01) | |

(Continued)

(52) U.S. Cl.
CPC ............ *B23K 1/0008* (2013.01); *B23K 1/002* (2013.01); *B23K 1/0056* (2013.01); *B23K 35/0244* (2013.01); *B23K 35/306* (2013.01); *F16H 1/2809* (2013.01); *F16H 1/321* (2013.01); *F16H 57/023* (2013.01); *F16H 57/082* (2013.01);
(Continued)

(58) Field of Classification Search
CPC .... B23K 1/0008; B23K 1/002; B23K 1/0056; B23K 35/0244; B23K 35/306; B23K 3/085; B23K 2101/008; B23K 1/008; F16H 1/2809; F16H 57/082; F16H 57/023; F16H 1/321; F16H 55/06; F16H 55/17; F16H 2055/176
USPC ........................................ 228/165–169, 174
See application file for complete search history.

(56) References Cited

U.S. PATENT DOCUMENTS 9,539,649 B2 *  1/2017  Nishikawa .............. B23B 45/02
9,764,592 B1 *  9/2017  Hays ..................... B60B 25/002
(Continued)

FOREIGN PATENT DOCUMENTS

JP       2009148779 A  *  7/2009
KR  20040100087 A  *  12/2004  ........... F16H 57/082
(Continued)

*Primary Examiner* — Kiley S Stoner
(74) *Attorney, Agent, or Firm* — Quinn IP Law (57) ABSTRACT

An article of manufacture comprises a first component having a first mating surface and a second component having a second mating surface. The first component may include an aperture having internal splines or gear teeth, and/or an outer perimeter having external splines or gear teeth. The first and second components are disposed such that a gap is provided between the first and second mating surfaces. Brazing material is disposed between the first and second mating surfaces so as to mechanically couple the first and second components. The first component may be made of a powdered metal or a non-powdered metal, and the second component may be made of the other of such two metals. In one embodiment, the first component may be a planetary carrier plate portion having internal splines and the second component may be a planetary carrier spider portion.

20 Claims, 6 Drawing Sheets

(51) Int. Cl.
*F16H 57/08* (2006.01)
*F16H 57/023* (2012.01)
*F16H 1/32* (2006.01)
*B23K 35/30* (2006.01)
*B23K 3/08* (2006.01)
*B23K 101/00* (2006.01)

(52) U.S. Cl.
CPC ........ *B23K 3/085* (2013.01); *B23K 2101/008* (2018.08)

(56) References Cited

U.S. PATENT DOCUMENTS

| | | | | |
|---|---|---|---|---|
| 9,869,385 | B1* | 1/2018 | Shah | F16H 57/082 |
| 2004/0013897 | A1* | 1/2004 | Yano | B23K 1/0008 |
| | | | | 428/548 |
| 2004/0235610 | A1* | 11/2004 | Jang | F16H 57/082 |
| | | | | 475/331 |
| 2005/0026744 | A1* | 2/2005 | Illerhaus | F16H 57/082 |
| | | | | 475/331 |
| 2008/0112834 | A1* | 5/2008 | Imazato | B22F 5/08 |
| | | | | 419/6 |
| 2011/0111247 | A1* | 5/2011 | Lemke | B23K 1/0008 |
| | | | | 428/600 |
| 2011/0162210 | A1* | 7/2011 | Poindexter | B26D 3/169 |
| | | | | 30/97 |
| 2012/0272525 | A1* | 11/2012 | Basin | B23P 15/14 |
| | | | | 29/893.1 |
| 2013/0091708 | A1* | 4/2013 | Paelicke | F16H 57/08 |
| | | | | 29/893.1 |
| 2015/0047942 | A1* | 2/2015 | Kimes | F16D 41/125 |
| | | | | 192/56.1 |
| 2016/0061315 | A1* | 3/2016 | Taylor | F16H 57/082 |
| | | | | 475/331 |
| 2016/0238126 | A1* | 8/2016 | Beck | F16H 57/082 |
| 2017/0108114 | A1* | 4/2017 | Uozumi | B30B 11/027 |
| 2017/0240036 | A1* | 8/2017 | Kobayashi | F16H 37/0806 |
| 2018/0016938 | A1* | 1/2018 | Doorbar | F16H 1/28 |
| 2018/0031113 | A1* | 2/2018 | Shah | F16H 57/082 |
| 2018/0031114 | A1* | 2/2018 | Shah | F16H 57/082 |
| 2018/0051747 | A1* | 2/2018 | Yamashita | F16C 33/145 |
| 2018/0243829 | A1* | 8/2018 | Shah | B22F 5/08 |
| 2018/0297119 | A1* | 10/2018 | Clarke | B22F 5/08 |
| 2019/0162286 | A1* | 5/2019 | Clark | F16H 55/06 |
| 2019/0376596 | A1* | 12/2019 | Clark | F16H 57/0482 |
| 2021/0025506 | A1* | 1/2021 | Yan | F16K 27/107 |
| 2021/0033124 | A1* | 2/2021 | Okuno | B23K 33/00 |
| 2021/0172511 | A1* | 6/2021 | Frey | F16H 1/28 |

FOREIGN PATENT DOCUMENTS

| | | | |
|---|---|---|---|
| KR | 20130005552 A | * | 1/2013 |
| KR | 101296330 B1 | * | 8/2013 |

* cited by examiner

METHOD OF MANUFACTURING COMPONENTS MADE OF DISSIMILAR METALS

INTRODUCTION

This disclosure generally relates to methods of manufacturing metal components, and more particularly to methods of manufacturing metal components made of dissimilar metals.

A planetary gearset (such as those used in automotive transmissions) is an arrangement of gears comprising a central sun gear, an outer ring gear, and a plurality of planet gears each disposed in dental engagement with both the sun gear and the ring gear. The planet gears are also rotatably supported by a planetary gear carrier, which is typically made of a metal such as steel or powdered metal.

Several factors may affect the decision of which raw material and processing steps to use for fabricating planetary gear carriers. These factors include: the geometric complexity of the carrier; the inclusion (or not) of splines or gear teeth as part of the carrier; the sizes and locations of holes, fillets and finished surfaces; the fabrication and processing steps needed to create any of these features; and the cost impact of each of the foregoing. After these factors are considered and evaluated, the typical result is to use either steel or powdered metal as the raw material. However, this decision oftentimes involves a compromise, where steel may be the best raw material to use because of certain aspects or features of the carrier, while powdered metal may be the best raw material to use because of other aspects or features. For example, making a geometrically complex carrier out of powdered metal may be less expensive than using steel, because geometrically complex features can easily be incorporated into a powdered metal part, whereas using steel may require additional machining steps that would not be required for the powdered metal part. But if the carrier includes features such as splines or gear teeth which require a relatively high degree of hardness, the powdered metal part may need to undergo a hardening process, which adds cost, whereas a steel part might not need any additional processing to achieve the desired hardness. Likewise, a carrier might include certain holes or fillets that are determined to be high-stress areas, where using steel may be more suitable than using a powdered metal material which is more brittle. But in these and other cases, the choice of which raw material to use is often a compromise based on cost and other factors.

It would be desirable, therefore, to provide an improved method of manufacturing metal components, such as planetary carriers and other items of manufacture, which avoids or minimizes these and other limitations.

SUMMARY

According to one embodiment, an article of manufacture includes: (i) a first component having a first mating surface and at least one of a substantially circular aperture therethrough having one of internal splines and internal gear teeth, and a substantially circular outer perimeter thereof having one of external splines and external gear teeth; (ii) a second component having a second mating surface, wherein the first and second components are disposed such that a gap is provided between the first and second mating surfaces thereby defining at least one bonding region thereat; and (iii) brazing material disposed between the first and second mating surfaces so as to mechanically couple the first and second components. The first component is made of one of a powdered metal and a non-powdered metal, and the second component is made of the other of the powdered metal and the non-powdered metal.

A depression may be formed in at least one of the first component and the second component proximate at least one bonding region. The article of manufacture may further include at least one of: a protrusion proximate at least one bonding region extending from at least one of the first mating surface and the second mating surface, and a depression proximate at least one bonding region formed in at least one of the first mating surface and the second mating surface. The first component may be a planetary gear carrier plate portion having internal splines and the second component may be a planetary gear carrier spider portion. The non-powdered metal has a melting point and the powdered metal has a sintering temperature lower than the melting point.

According to one embodiment, a planetary gear carrier includes: (i) a plate portion having a substantially circular outer perimeter defining a generally circular first major surface and a substantially circular aperture therethrough aligned coaxially with the outer perimeter and having internal splines; (ii) a spider portion having a generally ring-like section with a plurality of substantially equidistantly spaced legs extending orthogonally from an outer perimeter of the ring-like section, wherein each leg terminates in a leg end having an end face, wherein the plate portion and the spider portion are disposed such that a gap is provided between at least a part of each leg end and the first major surface of the plate portion thereby defining a bonding region thereat; and (iii) brazing material disposed between each leg end and the first major surface so as to mechanically couple the spider portion and the plate portion. The plate portion is made of one of a powdered metal and a non-powdered metal, and the spider portion is made of the other of the powdered metal and the non-powdered metal.

The brazing material may be in contact with both the plate portion and the spider portion. A depression may be formed in at least one of the plate portion and the spider portion proximate at least one bonding region. At least one end face may have a depression formed therein, and each depression may be formed within the perimeter of its respective end face. A through-hole may be formed in at least one of the plate portion and the spider portion proximate at least one bonding region. At least one leg end may include a protrusion extending therefrom in substantial contact with the first major surface. The plate portion may include a boss proximate at least one bonding region in substantial contact with a respective leg end. The non-powdered metal may be steel and the powdered metal may be a powdered metal alloy, and the brazing material may be metallurgically capable of mechanically bonding with each of the powdered metal and the non-powdered metal.

According to one embodiment, a method of manufacturing includes: (i) positioning a first component having a first mating surface and at least one of internal splines, internal gear teeth, external splines and external gear teeth, a second component having a second mating surface, and a brazing material, wherein the first component is made of one of a powdered metal and a non-powdered metal, the second component is made of the other of the powdered metal and the non-powdered metal, and the first and second components are disposed such that a gap is provided between the first and second mating surfaces and the brazing material is disposed at one of in the gap and adjacent the gap; (ii) heating the brazing material to at least its melting point temperature; and (iii) cooling the brazing material so as to mechanically couple the first and second components. The heating step may be accomplished by use of one of a furnace, induction heating, and a laser diode. In the heating step, the brazing material may flow by capillary action within the gap and wet both the first and second mating surfaces. The cooling step may be accomplished by one of allowing the brazing metal to cool and urging the brazing material to cool. In this method, the first component may be a planetary carrier plate portion having internal splines and the second component may be a planetary gear carrier spider portion. The non-powdered metal has a melting point temperature and the powdered metal has a sintering temperature lower than the melting point temperature of the non-powdered metal.

DETAILED DESCRIPTION

Referring now to the drawings, wherein like numerals indicate like parts in the several views, a method for manufacturing metal components made of dissimilar metals, and an article of manufacture produced by such method, are shown and described herein.

Figure 1:
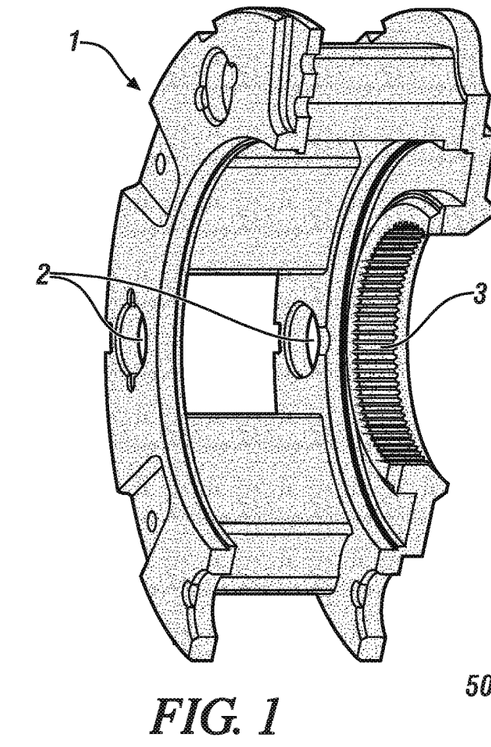
FIG. 1 is a perspective view of a portion of a planetary gear carrier.

FIG. 1 shows a planetary gear carrier 1, having sets of opposed holes 2 for the spindles of planetary gears (not shown) and internal splines 3. As described above, planetary gear carriers 1 are typically made of metal, such as steel or powdered metal. Because of the geometric complexity of a carrier's shape, carriers 1 may be made of powdered metal which in many instances may cause the carrier 1 to be less expensive to manufacture than if it were made of machined steel, for instance. However, because the carrier 1 includes splines 3 which may need to be of a sufficient hardness, the entire powdered metal carrier 1 may need to undergo heat treating, such as in a controlled atmosphere oven, in order to harden the splines 3. But this also hardens the entire carrier 1, which may not be desirable from a cost or force-loading perspective. Alternatively, rather than subjecting the entire carrier 1 to the hardening process using an oven, the carrier 1 could instead be subjected to targeted hardening methods, such as hardening with an induction coil, which can be focused on the splines 3 or other areas requiring hardening. So although using a powdered metal rather than steel may initially cost less, the subsequent heat treating process adds cost. And yet, choosing to make the carrier 1 out of steel may likewise raise cost, functionality and/or other concerns. For example, steel may be a good candidate material because of its high tensile strength and ductility, but it may be more difficult (and more expensive) to use steel to produce geometrically complex parts, plus additional machining and other steps may be required which would not have been required if powdered metal were used.

Figure 2:
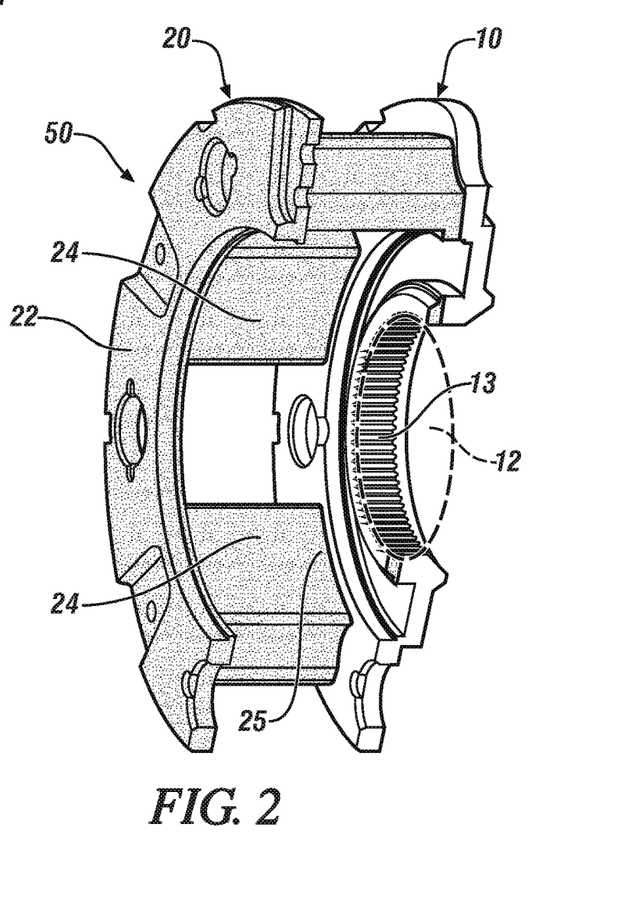
FIG. 2 is a perspective view of a portion of a planetary gear carrier according to an embodiment of the disclosure.
Figure 3A:
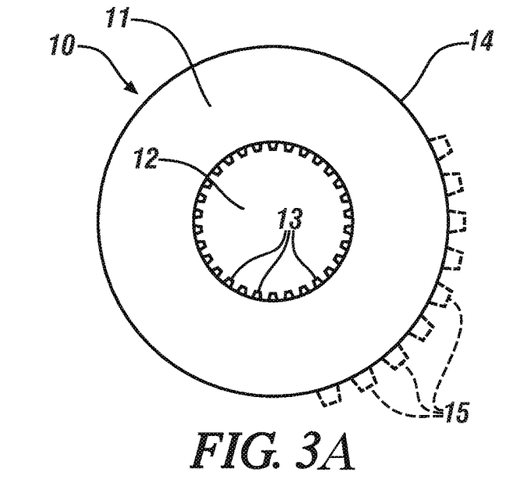
FIGS. 3A and 3B show plan views of a planetary carrier plate portion and a planetary carrier spider portion, respectively, according to an embodiment of the disclosure.
Figure 3B:
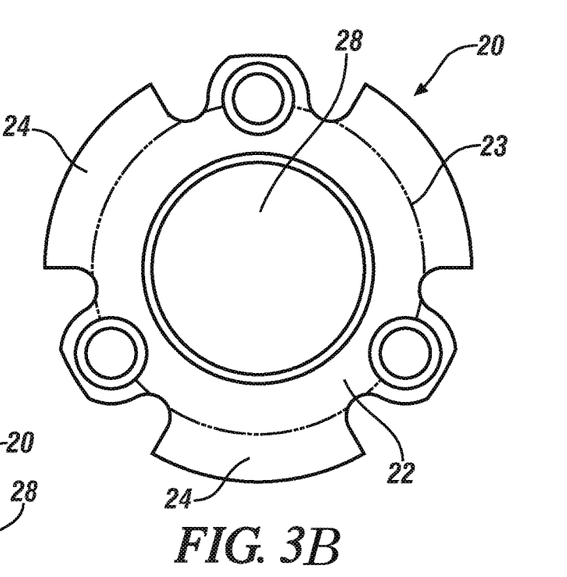
Figure 4:
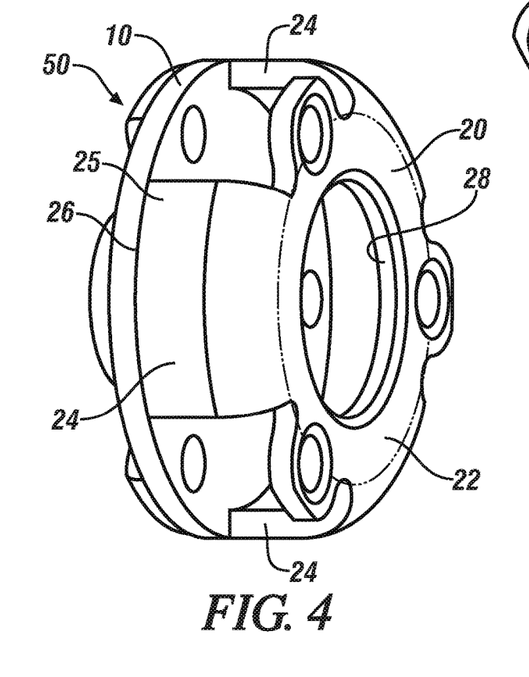
FIG. 4 is a perspective view of a planetary carrier according to an embodiment of the disclosure.

The present disclosure pertains to a method for producing components, such as a planetary gear carrier, which is an improved alternative to the approaches described above. As seen by comparing the examples shown in FIGS. 1-4, an article of manufacture 50 may be visualized as comprising two complementary portions 10/20, each having unique geometric, functional and/or other characteristics as compared to the other portion. For example, if the article of manufacture is a planetary gear carrier 50, it can be visualized as a generally flat plate or plate-like portion 10 and a more geometrically complex spider portion 20. Additionally, the plate portion 10 might include internal or external splines or gear teeth 13/15, whereas the spider portion 20 might not, or vice versa. As shown in FIGS. 2-4, the plate portion 10 (sometimes also referred to as a "flange") has a substantially circular outer perimeter 14 defining a first generally circular major surface or face 11, and has a substantially circular aperture 12 therethrough which is aligned coaxially with the outer perimeter 14 and has internal splines 13. The spider portion 20 has a generally ring-like section 22 with a plurality of substantially equidistantly spaced legs 24 extending orthogonally and in the same direction from an outer perimeter or outer periphery 23 of the ring-like section 22, with each leg 24 terminating in a leg end 25 having an end face 26. The spider portion 20 may also include a generally circular aperture 28 centered about the axis of the spider, as shown in FIG. 4. (The generally ring-like section 22 may be generally ring-shaped, with an outer perimeter or outer periphery 23 thereof having a generally circular shape, and a generally circular aperture 28 about the center of and generally concentric with the outer perimeter or periphery 23.) The plate portion 10 and the spider portion 20 are disposed proximate to one another such that a gap 30 is provided between at least a part of each leg end 25 or end face 26 and the first major surface 11 of the plate portion 10. A bonding region is defined where each leg end 25 or end face 26 is in contact or near-contact with the first major surface 11, and may include the immediately adjacent area of the leg end 25 and/or first major surface 11 thereabout. Brazing material 40 is disposed between each leg end 25 or end face 26 and the first major surface 11 (for example, within at least a portion of the gap 30) so as to mechanically couple the spider portion 20 and the plate portion 10. With this configuration, one of the portions 10/20 may be made of a powdered metal and the other portion 20/10 may be made of a non-powdered metal.

For example, the plate portion 10 may be made of a non-powdered metal such as steel, and the spider portion 20 may be made of powdered metal such as a powdered metal alloy. Alternatively, the plate portion 10 may be made of a powdered metal such as a powdered metal alloy, and the spider portion 20 may be made of a non-powdered metal such as steel. The choice of which metals (i.e., powdered metal versus non-powdered metal) to use to make each of the two portions 10/20 may depend on a variety of factors, such as the relative geometric complexity of the portions; the time, cost and/or difficulty involved to manufacture each portion; which portions need to include splines and/or gear teeth; and the like. The powdered metal may be an alloy of ferrous metals, non-ferrous metals and/or non-metals, such as iron, copper, magnesium, molybdenum, chromium, nickel, cobalt, titanium, aluminum, tungsten, beryllium, zinc, tin, carbon and silicon. The non-powdered metal has a melting point, and the powdered metal has a sintering temperature which is lower than the non-powdered metal's melting point. For example, the plate portion 10 may be made of a carbon steel having a melting temperature of about 2500 to 2800 degrees Fahrenheit (depending on the carbon content), and the spider portion 20 may be made of a powdered metal alloy containing iron and carbon and having a sintering temperature of about 2000 to 2200 degrees Fahrenheit.

The brazing material 40 may be brazing pellets, brazing paste, brazing powder, etc., and may be a material that is metallurgically capable of mechanically bonding with each of the powdered metal and the non-powdered metal used in the portions 10/20. The brazing material 40 may include one or more metals, flux, one or more binders, etc. For example, the metal component of the brazing material 40 may include one or more of nickel, silver, copper, tin, iron, carbon, cobalt, phosphorous and the like. For the example above wherein a carbon steel plate portion 10 is joined to an iron/carbon powdered metal spider 20, the brazing material 40 may contain a mixture of iron, carbon and copper (plus flux, binder and other trace metals) having a brazing temperature of about 1800 degrees Fahrenheit, which is lower than both the carbon steel melting temperature and the iron/carbon powdered metal sintering temperature. The brazing material 40 may be located in the gap 30 such that it is in contact with both the plate portion 10 and the spider portion 20 so as to mechanically couple the two portions 10/20 to each other.

Figure 5A:
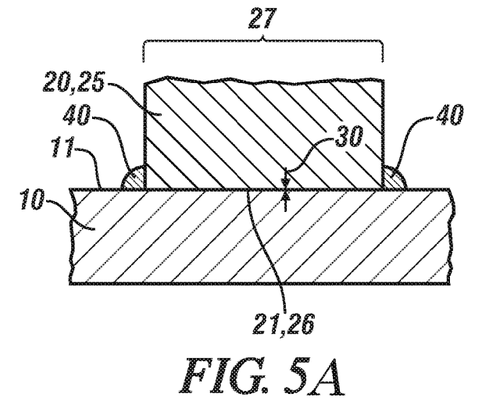
FIGS. 5-11 are cross-sectional views of first and second components joined according to multiple embodiments of the disclosure.
Figure 5B:
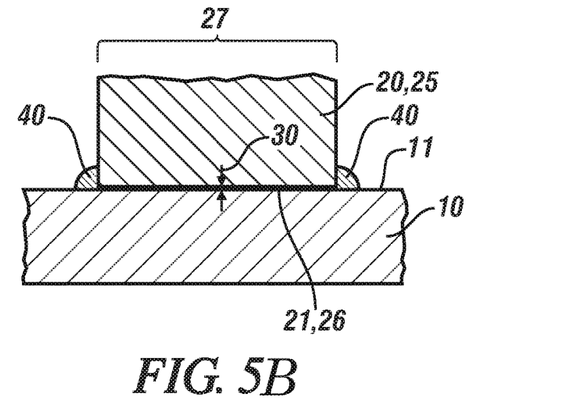
Figure 6A:
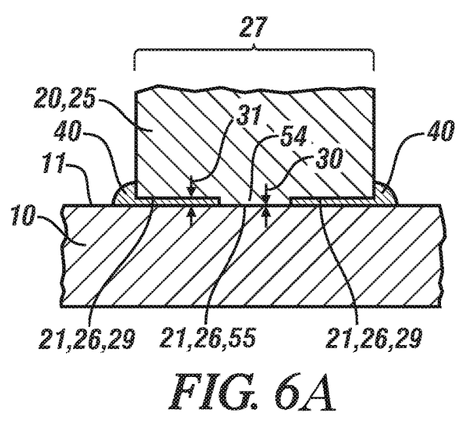
Figure 6B:
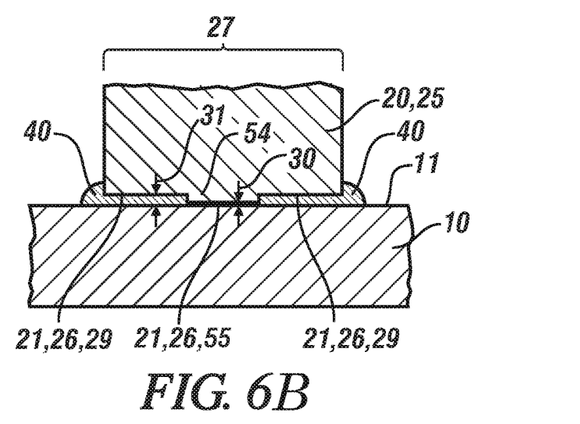
Figure 8A:
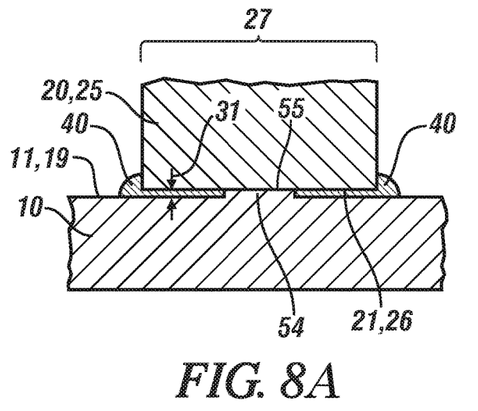
Figure 8B:
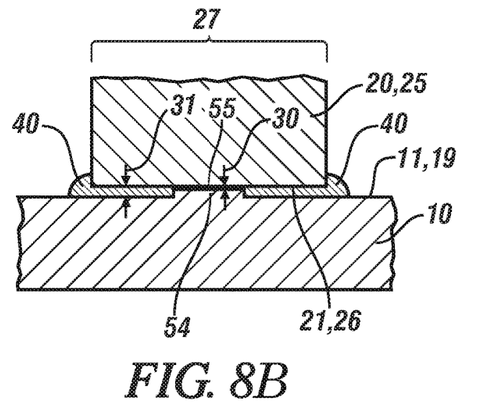
Figure 9A:
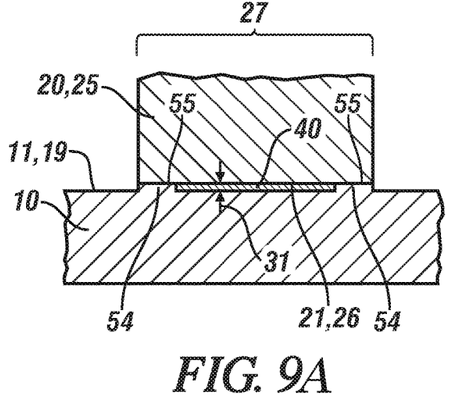
Figure 9B:
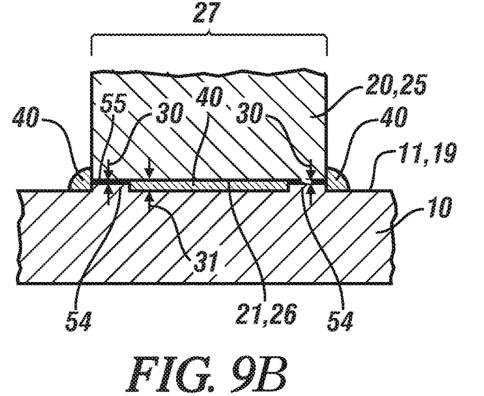

The gap 30 between the first and second major/mating surfaces 11/21 (and the brazing material 40 which may fill some of or a major portion of this gap 30) may or may not be visible to the naked eye. For example, in FIG. 5A, it appears that the second mating surface/end face 21/26 of the leg end 25 is sitting in direct contact with the first mating surface 11 of the plate portion 10. That is, there appears to be no visible gap 30 between the two surfaces 21/11, and therefore no brazing material 40 therebetween. The same appears to be true in FIG. 6A, where the leg end 25 has a boss or protrusion 54 extending out therefrom, with the protrusion 54 disposed in direct contact with the surface 11 of the plate portion 10. Likewise, FIGS. 8A and 9A show single and double bosses 54, respectively, extending up from the first major/mating surface 11, in apparent direct contact with the opposing second major/mating surface 21. However, when the brazing material 40 is heated sufficiently as described in the method 100 below, the brazing material 40 may melt and flow or "wick" by capillary action between the two surfaces 11/21. This is because the surface finish of the first and second major/mating surfaces 11/21 has very small "peaks" and "valleys" therein, unless the surfaces 11/21 are highly polished. So, even when the two surfaces 11/21 are placed in what appears to be direct contact with each other (sometimes referred to herein as "contact or near-contact" and "substantial contact"), their respective surface irregularities will create very small interstices and pathways for the melted brazing material 40 to wick or flow by capillary action therein and therebetween. However, there may also be cases where the contact points between the two surfaces 11/21 are sufficiently separated that a gap 30 (with brazing material 40 therein) is indeed visible; this is the case with FIGS. 5B, 6B, 7B, 8B, 9B and 10B.

Figure 7A:
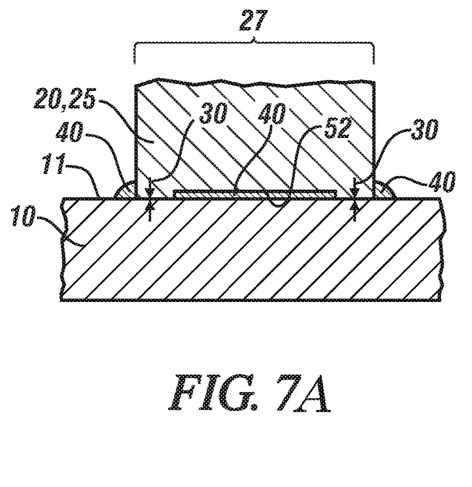
Figure 7B:
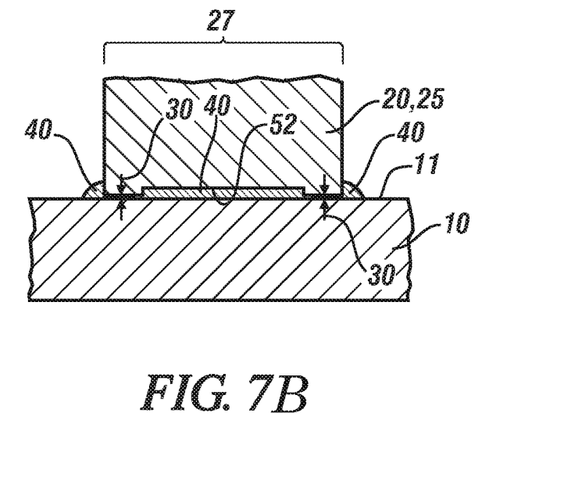
Figure 10A:
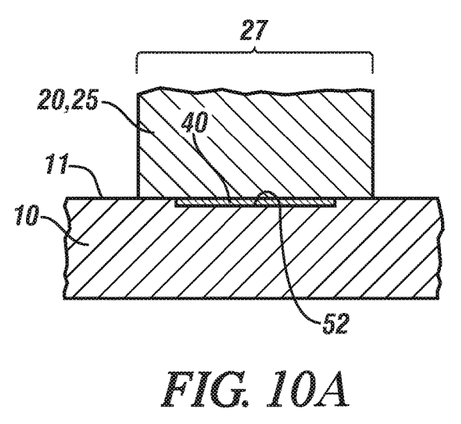
Figure 10B:
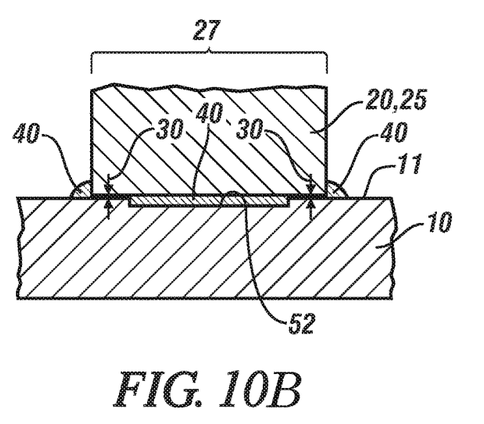
Figure 11A:
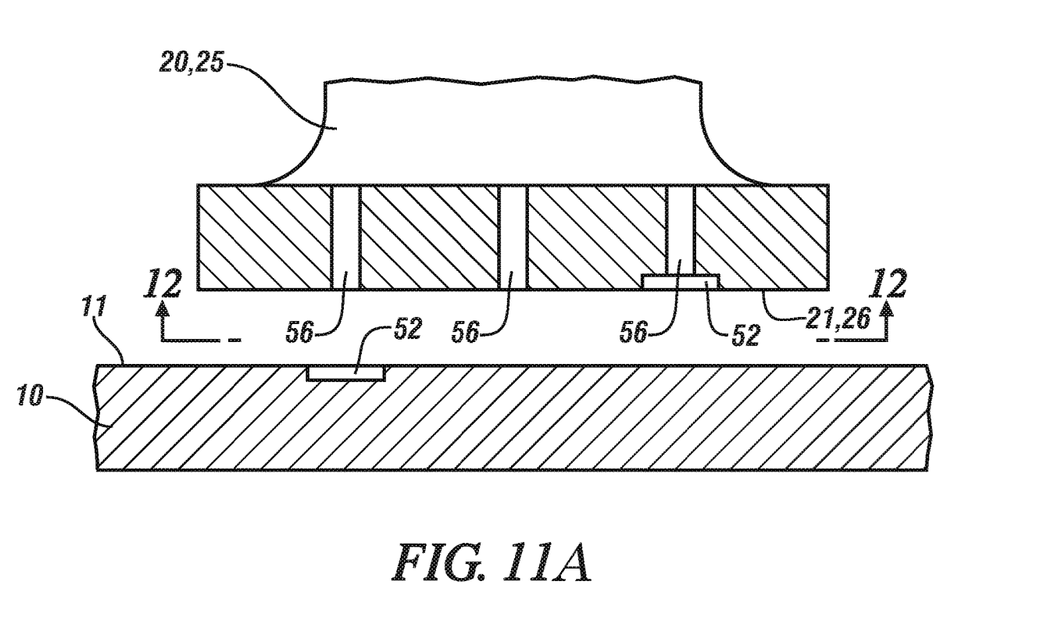
Figure 11B:
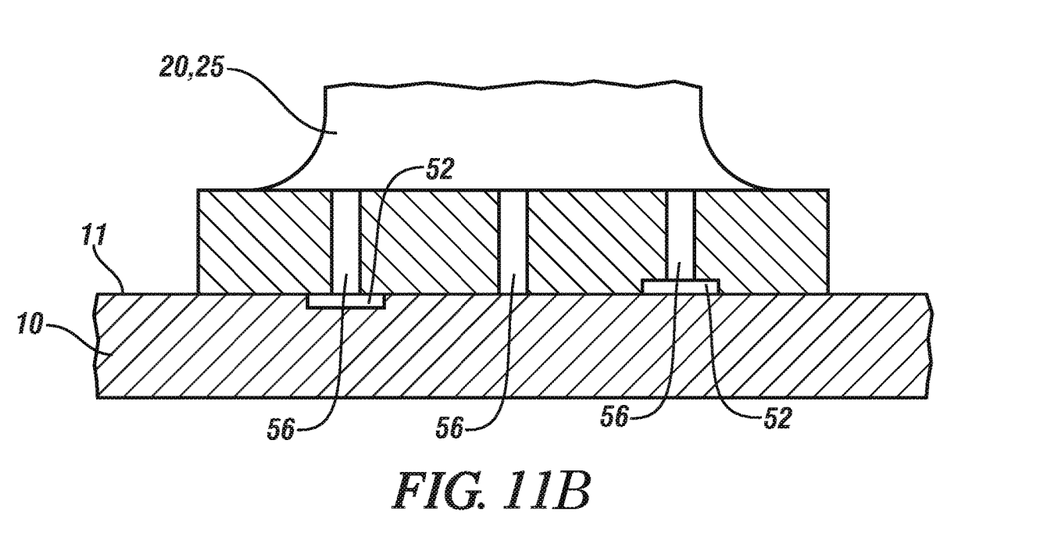
Figure 12:
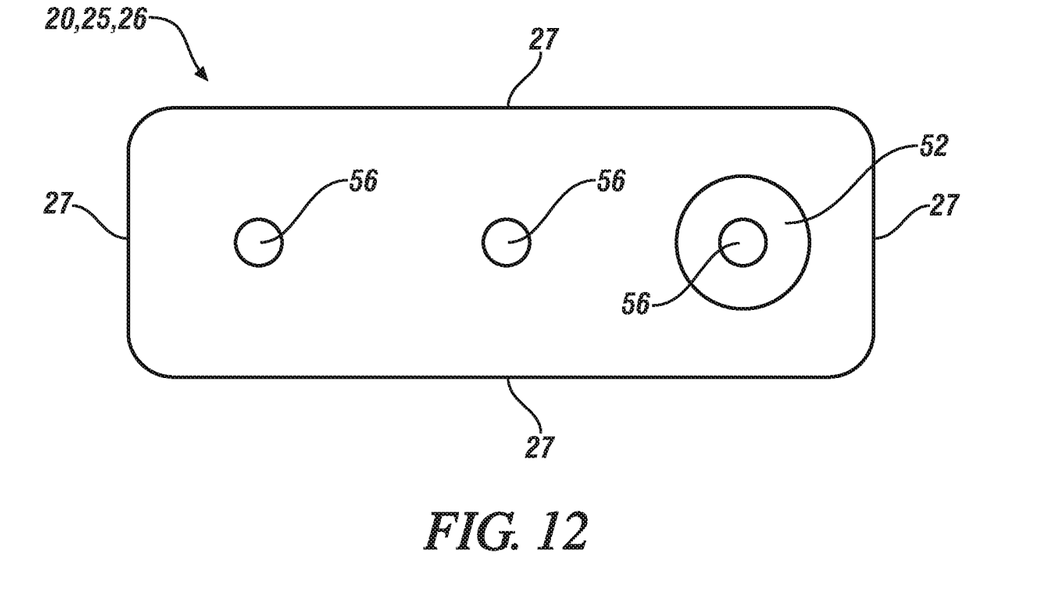
FIG. 12 is a plan view of an end face of a spider portion leg end according to an embodiment of the disclosure.

A depression 52 may be formed in the plate portion 10 (FIG. 10) and/or in the spider portion 20 (FIGS. 7 and 11) proximate one or more of the bonding regions. At least some of the brazing material 40 may be disposed in the depression 52. As shown in FIGS. 7 and 11, the depression 52 may be formed in one or more end face 26 in the second mating surface 21 of a leg end 25. As shown in FIG. 12, the depression 52 may be formed within the perimeter 27 of its respective end face 26. Here, a through-hole 56 is shown concentric with a circular-shaped depression 52. This through-hole 56 may also be seen in FIG. 11, where it extends through the entire thickness of the leg end 25. Such through-holes 56 may be formed in the plate portion 10, the spider portion 20 or both 10/20, and these are typically located proximate at least one bonding region. One purpose of the through-hole 56 may be that brazing material 40 may be deposited therein in preparation for heating and reflow of the brazing material, 40, which will be described below.

As shown in FIGS. 6 and 8, one or more leg end 25 may include at least one protrusion or boss 54 extending therefrom in a direction generally orthogonal to and in substantial contact with the first major surface 11 of the plate portion 10, and/or the first major surface 11 of the plate portion 10 may include a protrusion or boss 54 extending therefrom generally orthogonal to and in substantial contact with a respective leg end 25 of the spider portion 20. The protrusion or boss 54 may be situated proximate at least one bonding region. As shown in FIG. 12, each end face 26 defines a respective end face perimeter 27. As illustrated in FIGS. 6, 8 and 9, each protrusion or boss 54 has a protrusion face 55. The plate portion 10 and spider portion 20 may be disposed with each of the legs 24 in contact with the plate portion 10, such that each of the protrusions 54 is positioned within an associated one of the end face perimeters 27. (Optionally, each of the protrusions 54 may be spaced away from its associated end face perimeter 27.) As seen in FIGS. 6, 8 and 9, the protrusions 54 create a spacing or offset 31 between the non-protrusion portions 19 of the first major surface 11 and the non-protrusion portions 29 of the leg end 25, thereby defining a trending region thereat. With this offset 31 being provided by the protrusion(s) 54, the brazing material 40 may be disposed between the non-protrusion portion 29 of each leg end 25 and the corresponding non-protrusion portion 19 of the first major surface 11. (In the method 100 discussed below, the brazing material 40 may initially be placed in or adjacent the offset 31.)

One embodiment of the present disclosure includes an article of manufacture 50 which includes a first component 10 and a second component 20 made of dissimilar metals. More specifically, one of the components 10/20 is made of a powdered metal and the other component 20/10 is made of a non-powdered metal. The first component 10 has a first mating surface 11 and includes a substantially circular aperture 12 therethrough, a substantially circular outer perimeter 14 thereof, or both 12/14. The first component 10 may include internal splines or gear teeth 13 within the aperture 12, and/or may include external splines or gear teeth 15 about the outer perimeter 14. In an exemplary embodiment, the article of manufacture 50 may be a planetary gear carrier 50, the first component 10 may be a plate portion 10 having internal splines 13 and the second component 20 may be a spider portion 20.

The second component 20 has a second mating surface 21 which may be interfaced in contact or near-contact with the first mating surface 11 of the first component 10. The first and second components 10/20 are disposed proximate each other such that a gap 30 is provided between the first and second mating surfaces 12/21, thereby defining at least one bonding region thereat. Brazing material 40 is disposed between the first and second mating surfaces 11/21 so as to mechanically couple the first and second components 10/20.

As with the plate portion 10 and spider portion 20 described earlier, in the article of manufacture 50 a depression 52 may be formed in the first component 10, the second component 20, or both, proximate at least one bonding region where the two components 10/20 are disposed in contact or near-contact with each other. At least some of the brazing material 40 may be disposed in the depression 52. The article 50 may further include a boss or protrusion 54 proximate at least one bonding region, extending from the first mating surface 11 of the first component 10 and/or from the second mating surface 21 of the second component 20. The article 50 may also include a depression proximate at least one bonding region formed in the first mating surface 11 of the first component 10 and/or formed in the second mating surface 21 of the second component 20.

Figure 13:
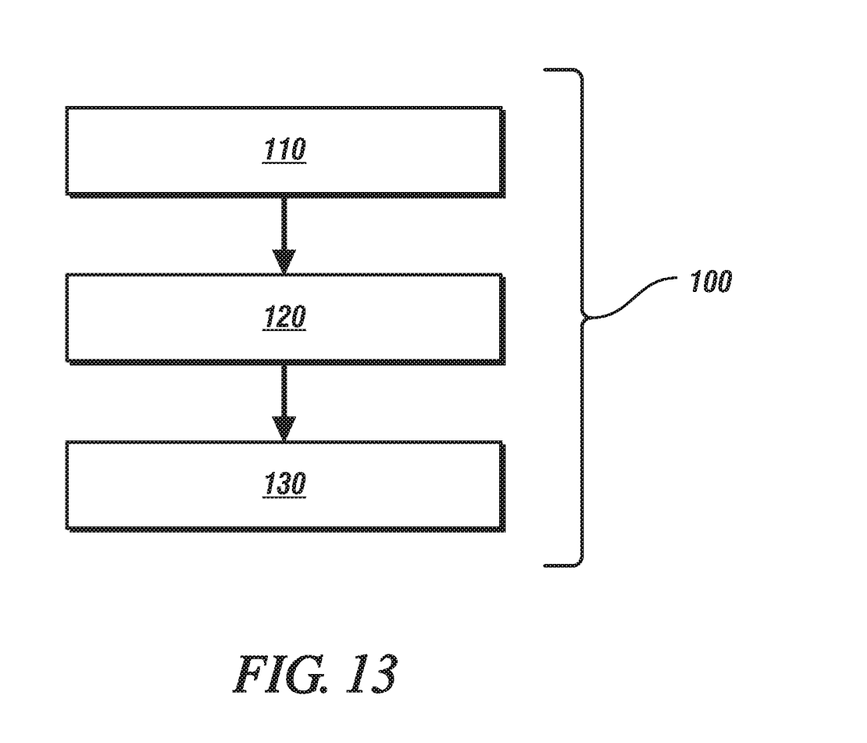
FIG. 13 is a flowchart of a method according to an embodiment of the disclosure.

FIG. 13 shows an embodiment of the present disclosure which includes a method of manufacturing 100, which comprises the following steps. In step 110, a first component 10 having a first mating surface 11, a second component 20 having a second mating surface 21, and brazing material 40 are positioned. The first component 10 includes internal splines/gear teeth 13 and/or external splines/gear teeth 15. The first and second components 10/20 are made of dissimilar metals. Specifically, one of the components 10/20 is made of a powdered metal, and the other component 20/10 is made of a non-powdered metal. The first and second components 10/20 are disposed proximate to one another such that a gap 30 is provided between the first and second mating surfaces 11/21 and the brazing material 40 is disposed either in the gap 30, adjacent the gap 30, or both. As mentioned above, the brazing material 40 may also be disposed in a through hole 56 adjacent to a bonding region in preparation for the next step.

In step 120, the brazing material 40 is heated to at least its melting point temperature. This is a temperature sufficient for the brazing material 40 to melt and flow via wicking or capillary action to fill in at least some of the spaces and interstices between the first and second mating surfaces 11/21. In this way, the melted brazing material 40 may wick or flow by capillary action within the gap 30 and "wet" both the first and second mating surfaces 11/21. If brazing material 40 was previously disposed in a through hole 56 or otherwise at or adjacent to a bonding region, then upon sufficient heating the brazing material 40 will flow or wick into the gap 30 associated with the bonding region. The heating step 120 may be accomplished by use of a furnace, induction heating, and/or a laser diode, so as to direct or provide sufficient heating energy to the brazing material 40 to cause melting and wicking/capillary action into the gap 30 between the surfaces 11/21.

In the step 130, the brazing material cools or is cooled so as to mechanically couple the first and second components 10/20. The cooling step 130 may be accomplished by allowing the brazing metal to cool naturally, and/or by urging the brazing material to cool, such as by the application of cooling liquids or gases. In one embodiment, the first component 10 may be a planetary carrier plate portion 10 having internal splines 13 and the second component 20 may be a planetary gear carrier spider portion 20. When the two portions 10/20 are joined, such as shown in FIGS. 2 and 4, each end face 26 of the spider portion 20 may be generally parallel to the first major surface 11 of the plate portion 10.

It should be noted that while a planetary gear carrier 50 comprising a plate portion 10 and a spider portion 20 made of dissimilar metals has been used as an exemplary embodiment herein, the article of manufacture 50 comprising the first and second components 10/20 may include many more embodiments and is not limited to a planetary gear carrier 50. By providing an article of manufacture 50 in two portions 10/20, it allows each of the two portions 10/20 to be made of two different metals or alloys, each providing different material properties and/or undergoing a different set of processing methods, and then the two portions 10/20 may be mechanically bonded together by brazing as described herein. For example, a more geometrically simple steel component 10 having splines or gear teeth 13 may be cast, stamped and heat treated, while a more geometrically complex component 20 may be pressed using powdered metal and sintered without requiring heat treating. The components 10/20 may then be disposed with their appropriate mating parts in contact or near-contact so as to provide a gap 30 with brazing material 40 in or adjacent to the gap 30, and then the arrangement may be heated and cooled so as to urge or allow the brazing material 40 to melt and then cool in at least portions of the gap 30 so that the two components 10/20 are mechanically bonded to one another. Thus, this approach may enable an article of manufacture to be produced at a lower cost than if the article were made of one metal and one piece.

The above description is intended to be illustrative, and not restrictive. While various specific embodiments have been presented, those skilled in the art will recognize that the disclosure can be practiced with various modifications within the spirit and scope of the claims. For example, the above-described embodiments (and/or aspects thereof) may be used in combination with each other. In addition, many modifications may be made to adapt a particular situation or material to the teachings of the disclosure without departing from its scope. While the dimensions and types of materials described herein are intended to be illustrative, they are by no means limiting and are exemplary embodiments. Many other embodiments will be apparent to those of skill in the art upon reviewing the above description. Moreover, in the following claims, use of the terms "first", "second", "top", "bottom", etc. are used merely as labels, and are not intended to impose numerical or positional requirements on their objects. Further, the limitations of the following claims are not written in means-plus-function or step-plus-function format and are not intended to be interpreted as such, unless and until such claim limitations expressly use the phrase "means for" or "step for" followed by a statement of function void of further structure. As used herein, an element or step recited in the singular and preceded by the word "a" or "an" should be understood as not excluding plural of such elements or steps, unless such exclusion is explicitly stated. Furthermore, references to a particular embodiment or example are not intended to be interpreted as excluding the existence of additional embodiments or examples that also incorporate the recited features. Moreover, unless explicitly stated to the contrary, embodiments "comprising" or "having" an element or a plurality of elements having a particular property may include additional such elements not having that property. And when broadly descriptive adverbs such as "substantially" and "generally" are used herein to modify an adjective, such as in the phrase "substantially circular", these adverbs mean "for the most part", "to a significant extent" and/or "to a large degree", and do not necessarily mean "completely", "strictly" or "entirely". For example, a "substantially circular shape" can include one or more of the following: a circle; a "nearly circular" ellipse whose major and minor axes have lengths within about 10% of each other; an undulatory shape that has an overall circular or nearly circular elliptical shape, such as a gear profile; and any of the foregoing shapes whose perimeter, in whole or in part, includes deviations inward and/or outward from the overall circular, nearly circular elliptical or undulatory shape. Such deviations may be intentional, such as for design purposes, or unintentional, such as due to variabilities arising from manufacturing processes. Additionally, the word "proximate" may be used herein to describe the location of an object or portion thereof with respect to another object or portion thereof, and/or to describe the positional relationship of two objects or their respective portions thereof with respect to each other, and may mean "near", "adjacent", "close to", "close by", "at" or the like.

The flowcharts and block diagrams in the drawings illustrate the architecture, functionality and/or operation of possible implementations of systems, methods and computer program products according to various embodiments of the present disclosure. In this regard, each block in the flowchart or block diagrams may represent a module, segment or portion of code, which includes one or more executable instructions for implementing the specified logical function(s). It will also be noted that each block of the block diagrams and/or flowchart illustrations, and combinations of blocks in the block diagrams and/or flowchart illustrations, may be implemented by hardware-based systems that perform the specified functions or acts, or combinations of hardware and computer instructions. These computer program instructions may also be stored in a computer-readable medium that can direct a controller or other programmable data processing apparatus to function in a particular manner, such that the instructions stored in the computer-readable medium produce an article of manufacture including instructions to implement the functions and/or actions specified in the flowcharts and block diagrams.

This written description uses examples, including the best mode, to enable those skilled in the art to make and use devices, systems and compositions of matter, and to perform methods, according to this disclosure. It is the following claims, including equivalents, which define the scope of the present disclosure.

What is claimed is:

1. An article of manufacture, comprising:
   a first component having a first mating surface and at least one of
   a substantially circular aperture therethrough having one of internal splines and internal gear teeth, and
   a substantially circular outer perimeter thereof having one of external splines and external gear teeth;
   a second component having a ring-like section and a plurality of legs extending orthogonally from the annular section, wherein each of the legs terminates in a respective leg end having a respective end face defining a respective end face perimeter; and
   a plurality of protrusions extending from one or more of the leg ends and/or from the first mating surface,
   wherein the first and second components are disposed with each of the legs in contact with the first component such that each of the protrusions is positioned within an associated one of the end face perimeters and an offset is provided between a non-protrusion portion of the first mating surface and a non-protrusion portion of each leg end, thereby defining a bonding region thereat; and
   brazing material disposed between the non-protrusion portion of each leg end and the non-protrusion portion of the first mating surface so as to mechanically couple the first and second components;
   wherein the first component is made of one of a powdered metal and a non-powdered metal, and the second component is made of the other of the powdered metal and the non-powdered metal.

2. An article of manufacture according to claim 1, wherein a depression is formed in at least one of the first component and the second component proximate at least one bonding region.

3. An article of manufacture according to claim 1, further comprising:
   a depression proximate at least one bonding region formed in at least one of the first mating surface and one or more of the end faces.

4. An article of manufacture according to claim 1, wherein the first component is a planetary gear carrier plate portion having internal splines and the second component is a planetary gear carrier spider portion.

5. An article of manufacture according to claim 1, wherein the non-powdered metal has a melting point and the powdered metal has a sintering temperature lower than the melting point.

6. A planetary gear carrier, comprising:
   a plate portion having a substantially circular outer perimeter defining a generally circular first major surface and a substantially circular aperture therethrough aligned coaxially with the outer perimeter and having internal splines;
   a spider portion having a generally annular section with a plurality of substantially equidistantly spaced legs extending orthogonally from an outer perimeter of the ring-like section, wherein each of the legs terminates in a respective leg end having a respective end face defining a respective end face perimeter; and
   a plurality of protrusions extending from one or more of the leg ends and/or from the first major surface,
   wherein the plate portion and the spider portion are disposed with each of the legs in contact with the plate portion such that each of the protrusions is positioned within an associated one of the end face perimeters and an offset is provided between a non-protrusion portion of the first major surface and a non-protrusion portion of each leg end, thereby defining a bonding region thereat; and
   brazing material disposed between each non-protrusion portion of each leg end and the non-protrusion portion of the first major surface so as to mechanically couple the spider portion and the plate portion;
   wherein the plate portion is made of one of a powdered metal and a non-powdered metal, and the spider portion is made of the other of the powdered metal and the non-powdered metal.

7. A planetary gear carrier according to claim 6, wherein the brazing material is in contact with both the plate portion and the spider portion.

8. A planetary gear carrier according to claim 6, wherein a depression is formed in at least one of the plate portion and the spider portion proximate at least one bonding region.

9. A planetary gear carrier according to claim 6, wherein at least one of the end faces has a depression formed therein.

10. A planetary gear carrier according to claim 9, wherein each depression is formed within the end face perimeter of a respective one of the end faces.

11. A planetary gear carrier according to claim 6, wherein a through-hole is formed in at least one of the plate portion and the spider portion proximate at least one bonding region.

12. A planetary gear carrier according to claim 6, wherein the non-powdered metal is steel and the powdered metal is a powdered metal alloy.

13. A planetary gear carrier according to claim 6, wherein the brazing material is metallurgically capable of mechanically bonding with each of the powdered metal and the non-powdered metal.

14. A method of manufacturing, comprising:
positioning a first component having a first mating surface and at least one of internal splines, internal gear teeth, external splines and external gear teeth, a second component having a ring-like section and a plurality of legs extending orthogonally from the annular section wherein each of the legs terminates in a respective leg end having a respective end face defining a respective end face perimeter, a plurality of protrusions extending from one or more of the leg ends and/or from the first mating surface, and a brazing material such that the first and second components are disposed with each of the legs in contact with the plate portion such that each of the protrusions is positioned within an associated one of the end face perimeters and an offset is provided between a non-protrusion portion of the first mating surface and a non-protrusion portion of each leg end and the brazing material is disposed at one of in the offset and adjacent the offset;

heating the brazing material to at least a melting point temperature of the brazing material; and
cooling the brazing material so as to mechanically couple the first and second components.

15. A method according to claim 14, wherein heating the brazing material is accomplished by use of one of a furnace, induction heating, and a laser diode.

16. A method according to claim 14, wherein cooling the brazing material is accomplished by one of allowing the brazing metal to cod and urging the brazing material to cool.

17. A method according to claim 14, wherein the first component is a planetary carrier plate portion having internal splines and the second component is a planetary gear carrier spider portion.

18. A method according to claim 14, wherein the non-powdered metal has a melting point temperature and the powdered metal has a sintering temperature lower than the melting point temperature of the non-powdered metal.

19. An article of manufacture according to claim 1, wherein each of the protrusions is spaced away from its associated end face perimeter.

20. A planetary gear carrier according to claim 6, wherein each of the protrusions is spaced away from its associated end face perimeter.

* * * * *